United States Patent
Iwama

(10) Patent No.: US 6,972,839 B2
(45) Date of Patent: *Dec. 6, 2005

(54) OPTICAL SPECTRUM ANALYZER AND OPTICAL SPECTRUM DETECTING METHOD

(75) Inventor: Takeo Iwama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,146

(22) Filed: Nov. 25, 2003

(65) Prior Publication Data

US 2004/0075832 A1   Apr. 22, 2004

Related U.S. Application Data

(62) Division of application No. 09/938,483, filed on Aug. 27, 2001, now Pat. No. 6,687,001.

(30) Foreign Application Priority Data

Mar. 16, 2001 (JP) .............................. 2001-076433

(51) Int. Cl.[7] .............................................. G01J 3/28
(52) U.S. Cl. ...................... 356/328; 356/326; 356/334
(58) Field of Search ........................ 356/328, 329, 356/330, 334, 308; 250/201.1; 359/305, 359/310

(56) References Cited

U.S. PATENT DOCUMENTS

| | | | | |
|---|---|---|---|---|
| 3,064,520 A | * | 11/1962 | Saunderson et al. | 356/329 |
| 3,163,698 A | * | 12/1964 | Saunderson et al. | 356/329 |
| 3,588,252 A | * | 6/1971 | Habosian | 356/307 |
| 3,650,630 A | * | 3/1972 | Habosian | 356/307 |
| 4,146,332 A | | 3/1979 | Moore | 356/308 |
| 5,066,126 A | | 11/1991 | Hatori | 356/328 |
| 5,299,045 A | | 3/1994 | Sekiguchi | 359/130 |
| 5,434,666 A | | 7/1995 | Carnahan et al. | 356/328 |
| 5,880,833 A | * | 3/1999 | Iwasaki | 356/328 |
| 5,946,090 A | | 8/1999 | Tashiro et al. | 356/326 |
| 5,946,128 A | | 8/1999 | Paek | 359/305 |
| 6,404,492 B1 | | 6/2002 | Xu et al. | 356/326 |
| 6,452,674 B1 | * | 9/2002 | Fujiyoshi | 356/328 |
| 6,678,044 B2 | * | 1/2004 | Kaneko | 356/334 |
| 6,687,001 B2 | * | 2/2004 | Iwama | 356/328 |

FOREIGN PATENT DOCUMENTS

| | | | | |
|---|---|---|---|---|
| JP | 63-171329 | | 7/1988 |
| JP | 05-087635 | | 4/1993 |
| JP | 9-210783 | | 8/1997 |
| JP | 09229849 A | * | 9/1997 |
| JP | 2001-050812 | | 2/2001 |
| JP | 2001-165773 | | 6/2001 |

* cited by examiner

Primary Examiner—Layla G. Lauchman
(74) Attorney, Agent, or Firm—Staas & Halsey LLP

(57) ABSTRACT

In an optical spectrum analyzer comprising a spectrograph and a photodevice array, and an optical spectrum detecting method, a wavelength deviation, from an assigned wavelength, of a light detected by a photodevice array which detects a wavelength of a diffraction light or a non-diffraction light from an acoustooptic device, is detected and a feedback control to a diffraction angle of the acoustooptic device is performed. Also, without using a feedback control, an exit light and a diffraction light from the acoustooptic device are respectively received by two photodevice arrays and the photodevices are arranged in order to mutually compensate gaps between the photodevices, whereby a center of each photodevice is similarly made coincide with a peak of an optical beam to be received.

6 Claims, 8 Drawing Sheets

FIG.1B PRESENT INVENTION

PHOTODEVICE ARRAY 71

PHOTODEVICE ARRAY 72

$\theta$ : DIFFRACTION ANGLE

TRANSMISSION-TYPE

REFLECTION-TYPE

OPTICAL SPECTRUM ANALYZER AND OPTICAL SPECTRUM DETECTING METHOD

This application is a divisional of application Ser. No. 09/938,483, filed Aug. 27, 2001, now U.S. Pat. No. 6,687,001.

BACKGROUND OF THE INVENTION

1. Field of the Invention

The present invention relates to an optical spectrum analyzer and an optical spectrum detecting method, and in particular to an optical spectrum analyzer and an optical spectrum detecting method having a function of monitoring optical power per wavelength of a wavelength-(division-) multiplexed optical transmission signal.

As an optical spectrum analyzer having such a function, one is known which is composed of a spectrograph and a photodevice array (e.g. Japanese Patent Application Laid-open No. 9-210783). In comparison with one having mechanical movable parts, such an optical spectrum analyzer is reliable, so that it has been of greater importance as one preferably applied to an optical transmission apparatus required to be used for a long term.

2. Description of the Related Art

FIG. 9 shows a prior art optical spectrum analyzer having no mechanical movable parts as mentioned above. In FIG. 9, an output light from an optical fiber 1 is separated into P polarization and S polarization by a polarization compensating plate 2, thereby suppressing a polarization dependence. Both polarizations are sent, through a lens 3, to a diffraction grating 4 serving as a spectrograph.

The polarizations are spatially separated per wavelength component in a wavelength-multiplexed optical transmission signal by the diffraction grating 4, reflected by a reflection mirror 60 through a lens 5, and inputted to a photodevice array 7.

By such an arrangement, a wavelength-multiplexed signal light is separated per wavelength at the diffraction grating 4, passes through the reflection mirror 60 for the enhancement of measurement accuracy, whereby a longer path is formed. The signal light then enters into a photodevice array 7 composed of a plurality of photodevices (not shown) to which wavelengths are preliminarily assigned, so that the wavelength and the power of the entered signal light are outputted to be measured.

Since such a prior art optical spectrum analyzer has an arrangement of detecting the wavelength-multiplexed optical transmission signal by the photodevice array, it has been disadvantageous that resolutions of a wavelength and optical power are limited and a high accuracy measurement is difficult.

Namely, in a conventional wavelength-multiplexed optical communication system, for the wavelength resolution, the number of the photodevices assigned for detecting a single wavelength is physically limited to three or so, resulting in a problem that the measurement accuracy deteriorates in case where a center (peak) of an optical beam does not enter into the photodevice array in the wavelength measurement.

This will be described referring to an example shown in FIG. 1A. When the photodevice array 7 is composed of photodevices such as PD1–PD5, and an incident light from the reflection mirror 60 has a power distribution 1, the peak of the incident light is formed between the photodevices PD2 and PD3, whereby the center of the photodevice does not coincide with that of the optical beam. As a result, a wavelength λ2 assigned to the adjoining photodevice PD2 is erroneously detected, although a wavelength λ3 assigned to the photodevice PD3, for example, should be detected.

SUMMARY OF THE INVENTION

It is accordingly an object of the present invention to achieve an optical spectrum analyzer and an optical spectrum detecting method wherein the analyzer is composed of a spectrograph and a photodevice array, and consistently enters an optical beam, without increasing the number of the photodevices composing a photodevice array, into a center of each photodevice.

In order to achieve the above-mentioned object, an optical spectrum analyzer according to the present invention comprises: a spectrograph, an acoustooptic device for diffracting an output light of the spectrograph, a photodevice array for detecting a wavelength of a diffraction light or a non-diffraction light from the acoustooptic device, and a control circuit for detecting a wavelength deviation, from an assigned wavelength, of a light detected by the photodevice array to control a diffraction angle of the acoustooptic device.

Namely, in an optical spectrum analyzer according to the present invention, an acoustooptic device having a substance whose refractive index (diffraction angle) is changed by modulating an acoustic frequency is substituted for a reflection mirror 60 in the prior art optical spectrum analyzer shown in FIG. 9. A control circuit detects a wavelength deviation, from an assigned wavelength, of a light detected by a photodevice array and controls the diffraction angle of the acoustooptic device.

Thus, as shown in FIG. 1B, the wavelength is shifted from the state of a power distribution 1 (corresponding to FIG. 1A) of an incident light in case where the acoustooptic device is not used, to the state of a power distribution 2. Accordingly, the center of the photodevice PD3, in this example, coincides with the peak of the incident light, so that the wavelength (and the power) of the incident light is measured as a wavelength λ3 preliminarily assigned to the photodevice PD3.

The above-mentioned control circuit may be composed of a wavelength deviation detecting circuit for detecting wavelength deviations between wavelengths preliminarily assigned to photodevices composing the photodevice array and a wavelength of the light detected by the photodevice array, a beam diffraction angle calculator for calculating, from the wavelength deviation, a beam diffraction angle for providing incident light to the photodevice corresponding to the assigned wavelength, and an acoustic frequency calculating circuit for calculating an acoustic frequency from the beam diffraction angle to be provided to the acoustooptic device.

Also, the above-mentioned wavelength deviation detecting circuit may be composed of a calculator for calculating a peak wavelength of the light detected by the photodevice array, and a detector for detecting a wavelength deviation between the peak wavelength and a closest wavelength among the photodevices in the photodevice array.

Furthermore, the above-mentioned calculator may obtain an intensity of each photodevice to obtain a Gaussian distribution from the intensity, thereby calculating the peak wavelength.

While the above-mentioned optical spectrum analyzer adjusts the angle of the diffraction light at the acoustooptic device by using a feedback loop from the photodevice array to the acoustooptic device, an optical spectrum analyzer without using such a feedback loop can be achieved by the present invention.

Namely, if two photodevice arrays are provided for respectively receiving an exit light and a diffraction light from the acoustooptic device, and for mutually compensating gaps between photodevices, accurate wavelength detection can be performed by either of the photodevice arrays.

It is to be noted that as the above-mentioned acoustooptic device, either a reflection-type or a transmission-type may be used, whereby the wavelength detection can be performed at the photodevice array by using the exit light and/or the diffraction light.

It is to be noted that the above-mentioned optical spectrum analyzer may further include a polarization compensating plate for separating a wavelength-multiplexed input signal into orthogonal components.

Furthermore, as the above-mentioned spectrograph, a diffraction grating may be used which spacially separates an output light of the polarization compensating plate into each wavelength component.

Also, in the present invention, for achieving the above-mentioned object, an optical spectrum detecting method is provided which detects, when an output light of a spectrograph is detected by a photodevice array through an acoustooptic device, a wavelength deviation, from an assigned wavelength, of a light detected by the photodevice array, and controls a diffraction angle of the acoustooptic device.

The above-mentioned control of the diffraction angle may be performed by detecting wavelength deviations between wavelengths preliminarily assigned to photodevices composing the photodevice array and a wavelength of the light detected by the photodevice array, by calculating, from the wavelength deviation, a beam diffraction angle for providing incident light to the photodevice corresponding to the assigned wavelength, and by calculating an acoustic frequency from the beam diffraction angle to be provided to the acoustooptic device.

The above-mentioned wavelength deviation may be detected by calculating a peak wavelength of the light detected by the photodevice array, and by detecting a wavelength deviation between the peak wavelength and a closest wavelength among the photodevices in the photodevice array.

Also, the above-mentioned peak wavelength may be calculated by obtaining an intensity of each photodevice and by obtaining a Gaussian distribution from the intensity.

BRIEF DESCRIPTION OF THE DRAWINGS

FIGS. 1A and 1B are diagrams for illustrating an operation of a spectrum analyzer according to the present invention as opposed to a prior art technology;

Throughout the figures, like reference numerals indicate like or corresponding components.

DESCRIPTION OF THE EMBODIMENTS

Figure 2:
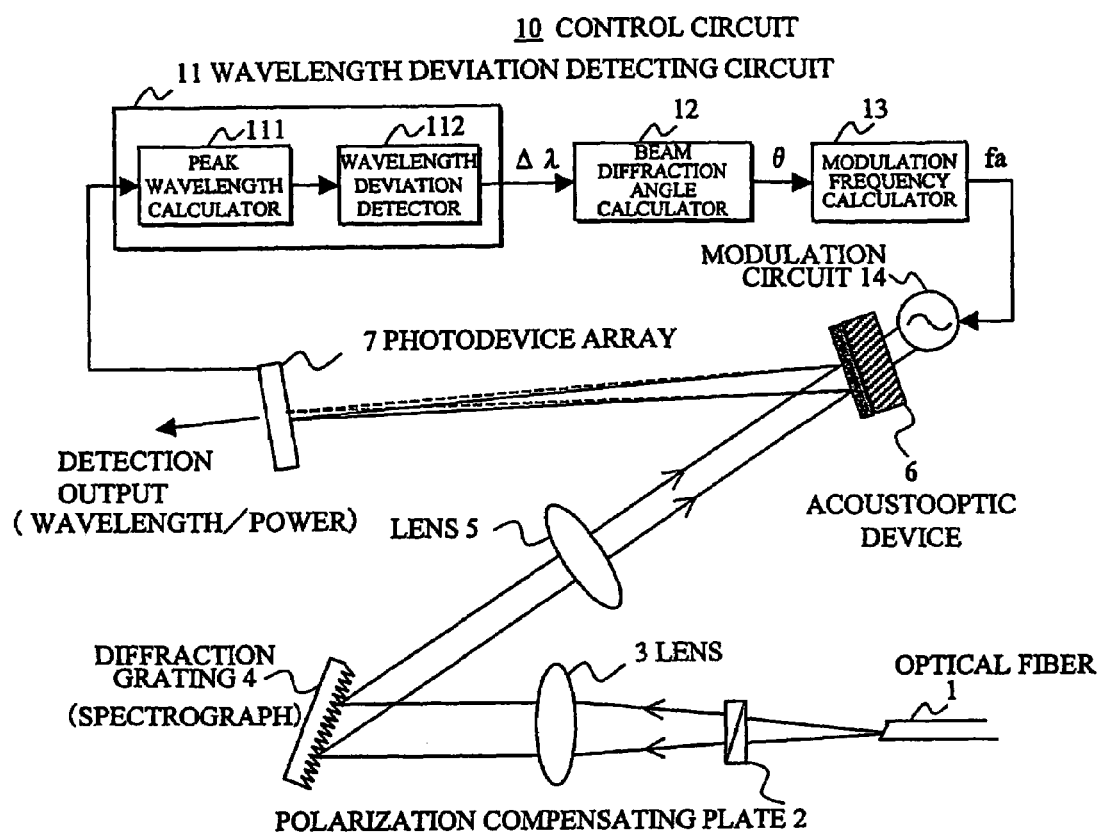
FIG. 2 is a block diagram showing a whole arrangement of a spectrum analyzer according to the present invention.
Figure 9:
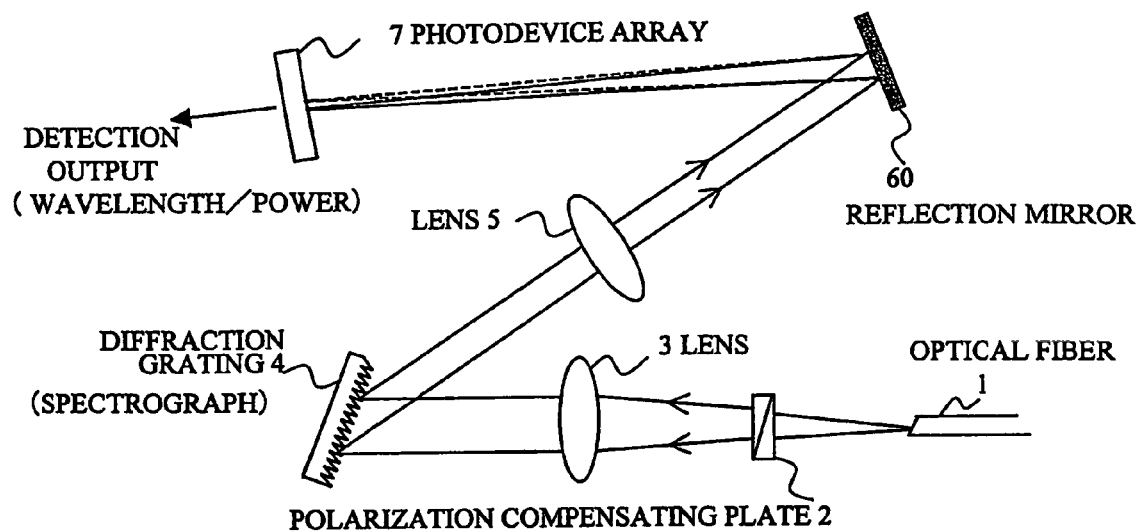
FIG. 9 is a block diagram showing a prior art optical spectrum analyzer.

FIG. 2 shows an embodiment of a whole optical spectrum analyzer according to the present invention. This arrangement is different from that of the prior art in FIG. 9 in that an acoustooptic device 6 where a refractive index (diffraction angle) is changed by applying a modulating voltage is substituted for the reflection mirror 60 and a control circuit 10 is provided to a feedback loop from the photodevice array 7 to the acoustooptic device 6.

The control circuit 10 is composed of a series circuit of a wavelength deviation detecting circuit 11, a beam diffraction angle calculator 12, a modulation frequency calculator 13, and a modulation circuit 14. The wavelength deviation detecting circuit 11 is further composed of a series circuit of a peak wavelength calculator 111 and a wavelength deviation detector 112.

The operation of the embodiment in the present invention will be sequentially described per each circuit. The wavelength deviation detecting circuit 11 will be firstly described.

Figure 3:
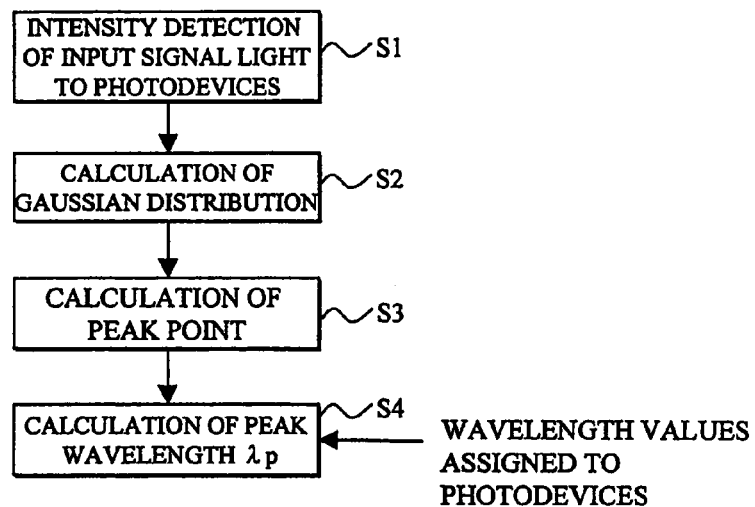
FIG. 3 is a block diagram showing an embodiment of a peak wavelength calculator used for a spectrum analyzer according to the present invention.

FIG. 3 shows an embodiment of the peak wavelength calculator 111 composing the wavelength deviation detecting circuit 11. In the peak wavelength calculator 111, the intensities of input signal lights to the photodevices composing the photodevice array 7 are firstly detected (at step S1).

Figure 4:
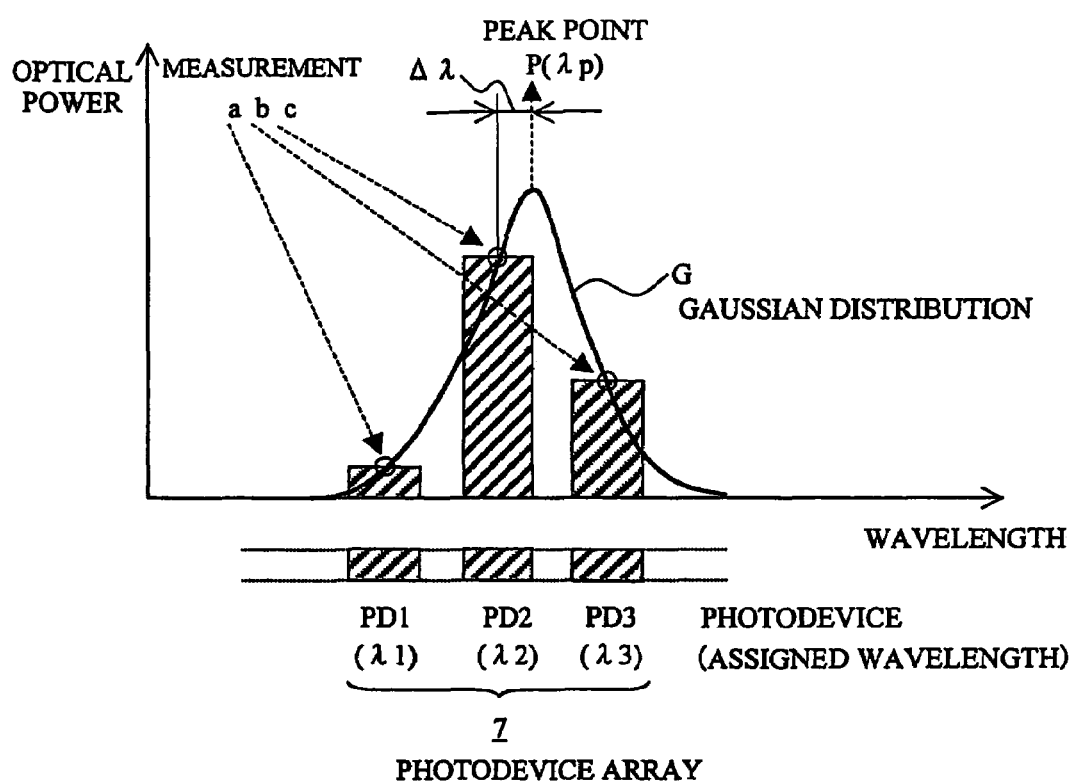
FIG. 4 is a graph for illustrating an operation of a peak wavelength calculator shown in FIG. 3.

As shown in FIG. 4, the intensities of the input signal lights in e.g. the photodevices PD1–PD3 in the photodevice array 7 are respectively measured as intensities a–c.

Based on the intensities a–c thus detected, the Gaussian distribution is obtained (at step S2). Thus, as shown in FIG. 4, Gaussian distribution G can be obtained.

As a result, a peak point P can be obtained (at step S3) together with the Gaussian distribution G.

Based on wavelengths $\lambda 1$–$\lambda 3$ preliminarily assigned to the respective photodevices PD1–PD3, a wavelength $\lambda p$ at the peak point P is calculated (at step S4).

It is to be noted that an initial wavelength value is required to be assigned to each photodevice of the photodevice array 7 at an initial state where a modulating voltage is not applied to the acoustooptic device 6.

Figure 5:
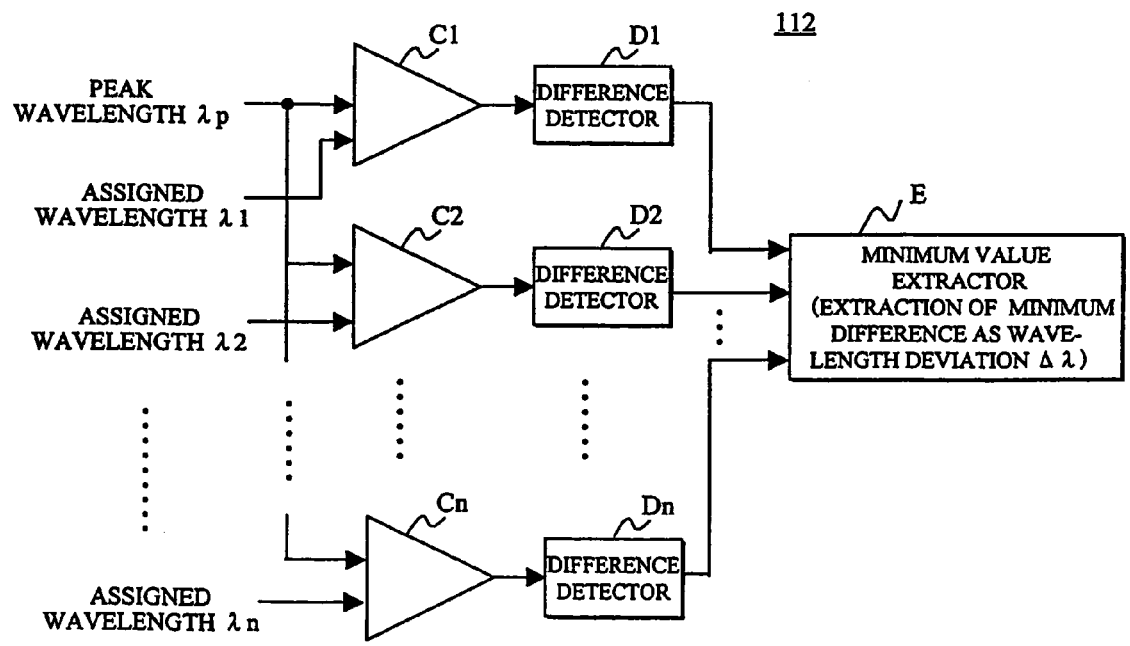
FIG. 5 is a block diagram showing an embodiment of a wavelength deviation detector used for an optical spectrum analyzer according to the present invention.

FIG. 5 shows an embodiment of the wavelength deviation detector 112. On the assumption that the number of assigned wavelengths is "n", the corresponding comparators C1–Cn are provided, to which the peak wavelength $\lambda p$ obtained in FIGS. 3 and 4 is commonly inputted. The assigned wavelengths $\lambda 1$–$\lambda n$ are inputted to the other terminals of the comparators C1–Cn.

The output signals of the comparators C1–Cn are respectively detected at difference detectors D1–Dn as a difference value to be provided to a minimum value extractor E, thereby extracting the minimum difference value as a wavelength deviation Δλ at the minimum value extractor E.

Thus, after detecting the wavelength deviation Δλ, the beam diffraction angle θ is calculated by using the wavelength deviation Δλ at the beam diffraction calculator 12 shown in FIG. 2.

Figure 6:
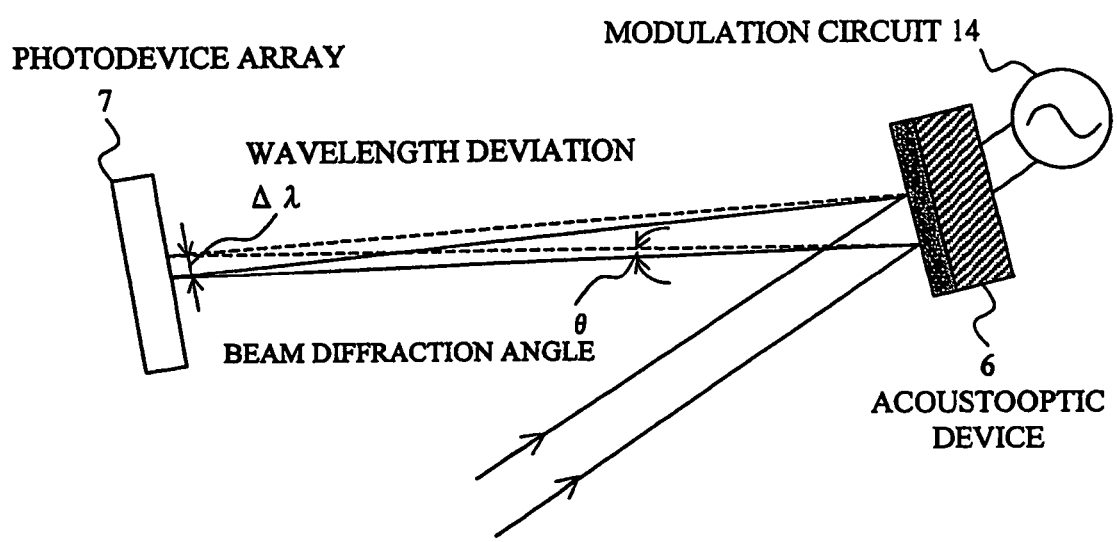
FIG. 6 is a schematic diagram showing a relationship between a beam diffraction angle and a wavelength deviation obtained by an optical spectrum analyzer according to the present invention.

FIG. 6 shows a relationship between the wavelength deviation Δλ detected at the wavelength deviation detecting circuit 11 and the beam diffraction angle θ. The beam diffraction angle θ for providing an incident light to a photodevice of the closest wavelength can be easily obtained in geometrical consideration of the distance between the acoustooptic device 6 and the photodevice array 7, a position deviation corresponding to the wavelength deviation Δλ, and the like.

When the beam diffraction angle θ is obtained at the beam diffraction angle calculator 12 in this way, a modulation frequency fa is calculated, based on the beam diffraction angle θ, at the modulation frequency calculator 13.

Namely, it is already known that the relationship between the diffraction angle θ of the optical beam and the acoustic frequency fa is given by the following equation:

$$\theta = \lambda \cdot fa/Va \qquad \text{Eq.(1)}$$

where
fa: acoustic wave frequency
θ: diffraction angle
Va: acoustic wave velocity
λ: wavelength assigned to the closest photodevice Accordingly, in the above-mentioned Eq(1) the acoustic frequency fa can be rewritten as in the following equation:

$$fa = \theta \cdot Va/\lambda \qquad \text{Eq.(2)}$$

Since the acoustic wave velocity Va and the wavelength λ are known values in Eq(2), the acoustic frequency fa can be obtained when a diffraction angle θ obtained at the beam diffraction calculator 12 is substituted as mentioned above.

When the modulation frequency fa is obtained at the modulation frequency calculator 13 in this way, the frequency fa is provided to the modulation circuit 14, which drives the acoustooptic device 6 by the frequency fa and can control a diffraction angle of an exit beam.

Figure 1A:
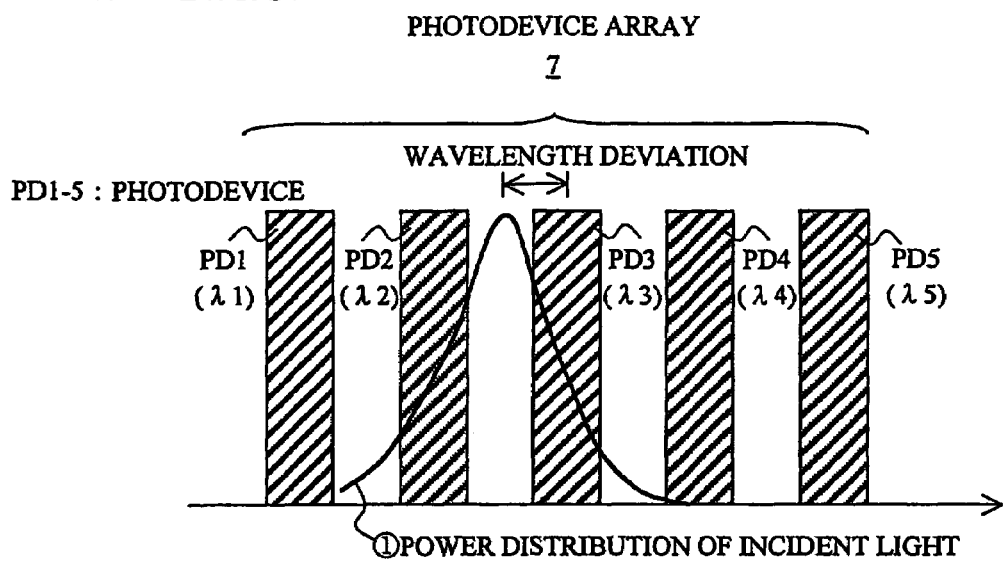
Figure 1A:
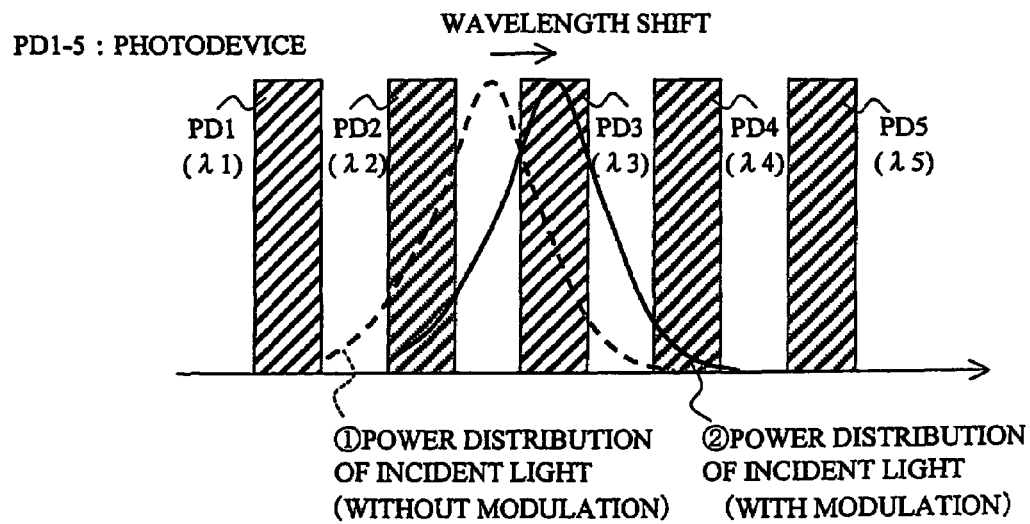

As a result, even when the optical beam enters into the middle of the photodevices PD2 and PD3 (power distribution 1), as shown in FIG. 1B, the beam center (power distribution 2) of the incident light is controlled to coincide with the center of the photodevice PD3 whose preliminarily assigned wavelength is the closest.

Figure 7A:
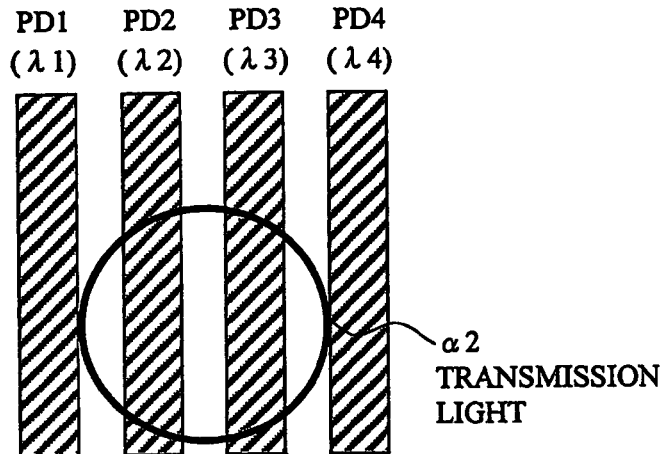
FIGS. 7A–7C are block diagrams showing another embodiment of an optical spectrum analyzer according to the present invention.
Figure 7B:
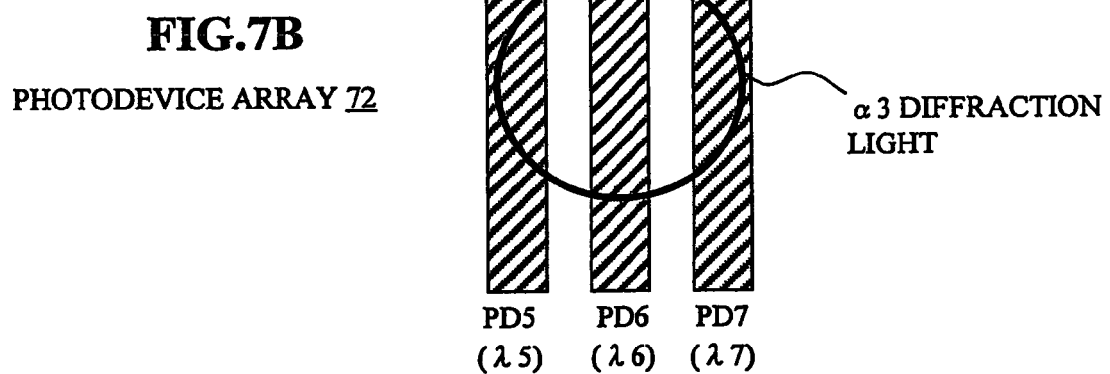
Figure 7C:
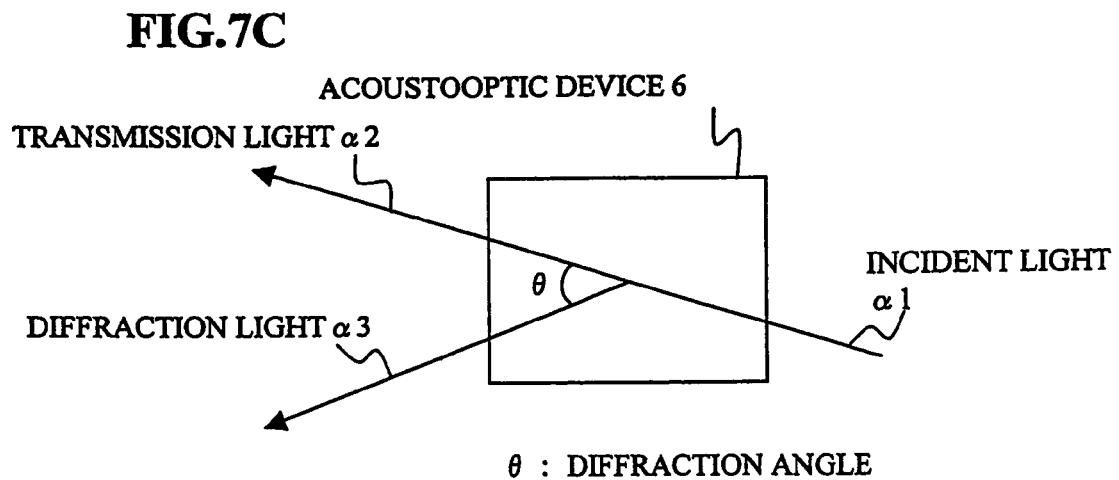

While in the above-mentioned embodiment, a feedback control is performed based on the control characteristic of the acoustooptic device, and the optical beam is controlled to come into the center of the assigned photodevice, an embodiment in case where such a feedback control is not performed is shown in FIGS. 7A–7C.

Namely, in this embodiment, two pairs of photodevice arrays 71 and 72 are prepared, where, as shown in FIGS. 7A–7C, photodevices PD1–PD7 are arranged so that the gaps between the photodevices PD1–PD4 composing the photodevice array 71 are compensated by the photodevices PD5–PD7 in the other photodevice array 72.

Accordingly, by utilizing that as shown in FIG. 7C, a transmission light α2 and a diffraction light α3 are separated from the incident light α1 with the diffraction angle θ to be outputted, the transmission light α2 is arranged to irradiate the photodevice array 71 shown in FIG. 7A for example, while on the other hand, the diffraction light α3 is arranged to irradiate the photodevice array 72 shown in FIG. 7B.

Thus, the center of the diffraction light α3 coincides with the photodevices PD6, even when the center of the transmission light α2 is located at the gap between the photodevices PD2 and PD3, enabling an accurate wavelength to be measured by the diffraction light α3.

Figure 8A:
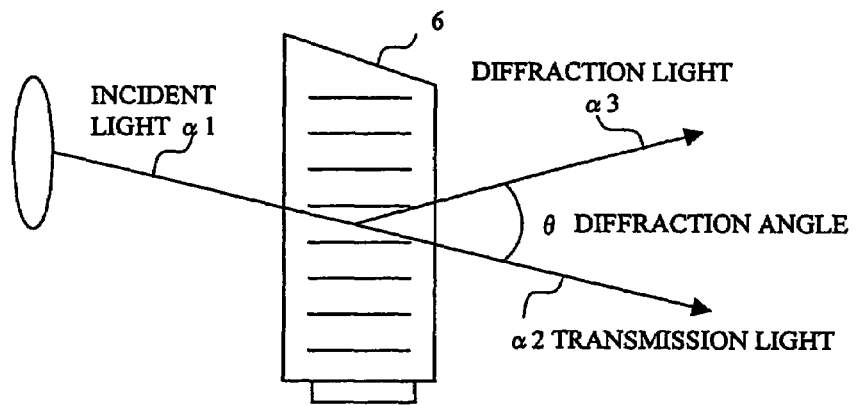
FIGS. 8A and 8B are block diagrams showing a kind of an acoustooptic device used for an optical spectrum analyzer according to the present invention.
Figure 8B:
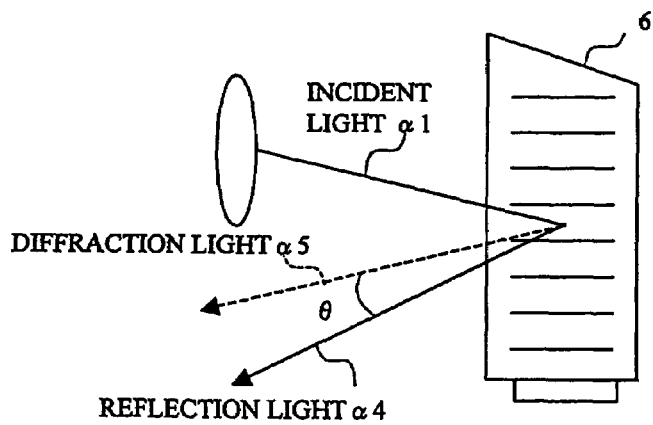

It is to be noted in the above-mentioned embodiments that FIG. 2 shows a reflection-type acoustooptic device, while FIG. 7 shows a transmission-type acoustooptic device 6. Furthermore, as shown in FIGS. 8A and 8B, either the transmission-type acoustooptic device shown in FIG. 8A or the reflection-type acoustooptic device shown in FIG. 8B can be applied to respective embodiments.

Furthermore, the beam diffraction angle is obtained for obtaining the frequency which modulates the acoustooptic device in the above-mentioned embodiments. However, the refractive index based on the wavelength deviation Δλ obtained at the wavelength deviation detecting circuit 11 may be obtained, whereby the modulation frequency fa may be obtained.

As described above, an optical spectrum analyzer and an optical spectrum detecting method according to the present invention are arranged so that a wavelength deviation, from an assigned wavelength, of a light detected by a photodevice array, which detects a wavelength of a diffraction light or a non-diffraction light from an acoustooptic device, is detected and a feedback control is performed to a diffraction angle of the acoustooptic device. Therefore, it becomes possible to consistently make a center of each photodevice coincide with a peak of an optical beam without increasing the number of the photodevices of a photodevice array and to accurately monitor an optical signal wavelength.

Also, in the present invention, without using a feedback control, an exit light and a diffraction light from the acoustooptic device are respectively received by two photodevice arrays so that the photodevices are arranged in order to mutually compensate gaps between the photodevices. Therefore, it becomes possible to similarly make a center of each photodevice coincide with a peak of an optical beam.

What is claimed is:

1. An optical spectrum analyzer comprising:
   a spectrograph outputting light;
   a device diffracting the light output from the spectrograph at an angle, the device being controllable to control the angle;
   a photodevice array detecting the light from the device; and
   a control circuit detecting a wavelength deviation in accordance with the light detected by the photodevice array and an assigned position of a wavelength of the diffracted light in the photodevice array, and controlling the device to control the angle in accordance with the detected wavelength deviation.

2. An optical spectrum analyzer comprising:
   a spectrograph outputting light;
   an device changing an angle of the light output from the spectrograph;
   a first photodevice array comprising photodevices with gaps between the photodevices; and
   a second photodevice array comprising photodevices, the photodevices of the second photodevice array being arranged to compensate for the gaps between the photodevices of the first photodevice array, the first and second photodevice arrays together detecting the light output by the spectrograph and having an angle changed by the device.

3. An optical spectrum analyzer comprising:

an acoustooptic device changing an angle of a light, the acoustooptic device being controllable to control the angle; and a photodevice array receiving the light having the changed angle, the acoustooptic device being controlled in accordance with a detected wavelength of the light as received by the photodevice array to control the angle.

4. An optical spectrum analyzer comprising:

an acoustooptic device changing an angle of light;

a photodevice array receiving the light having the changed angle; and means for controlling the acoustooptic device to control the angle in accordance with a detected wavelength of the light as received by the photodevice array to thereby improve measurement accuracy of the optical spectrum analyzer.

5. An optical spectrum analyzer comprising:

a spectrograph outputting light;

a device changing an angle of the light output from the spectrograph;

a photodevice array detecting light having an angle changed by the device; and means for detecting a wavelength deviation in accordance with the light detected by the photodevice array and an assigned position of a wavelength of the light in the photodevice array, and for controlling the device to control the angle in accordance with the detected wavelength deviation.

6. An optical spectrum analyzer comprising:

a device diffracting light;

a first photodevice array comprising photodevices with gaps between the photodevices; and a second photodevice array comprising photodevices, the photodevices of the second photodevice array being arranged to compensate for the gaps between the photodevices of the first photodevice array, the first and second photodevice arrays together detecting the light diffracted by the device to thereby detect a spectrum by the optical spectrum analyzer.

* * * * *

UNITED STATES PATENT AND TRADEMARK OFFICE
CERTIFICATE OF CORRECTION

| | | |
|---|---|---|
| PATENT NO. | : 6,972,839 B2 | |
| APPLICATION NO. | : 10/720146 | |
| DATED | : December 6, 2005 | |
| INVENTOR(S) | : Takeo Iwama | |

It is certified that error appears in the above-identified patent and that said Letters Patent is hereby corrected as shown below:

Column 6,
Line 57, change "an device" to -- a device --.

Signed and Sealed this

Twenty-seventh Day of June, 2006

JON W. DUDAS
*Director of the United States Patent and Trademark Office*